Jan. 12, 1971  H. B. MORRIS  3,555,503
ACCELERATION DEPENDENT PHASE CONTROL SEISMIC EXPLORATION
Original Filed Dec. 31, 1968  2 Sheets-Sheet 1

INVENTOR:
HAROLD B. MORRIS
ATTORNEY

United States Patent Office 3,555,503
Patented Jan. 12, 1971

---

3,555,503
ACCELERATION DEPENDENT PHASE CONTROL SEISMIC EXPLORATION
Harold B. Morris, Houston, Tex., assignor to Electronic Systems, Inc., Houston, Tex., a corporation of Texas
Original application Dec. 31, 1968, Ser. No. 799,138, now Patent No. 3,489,997, dated Jan. 13, 1970. Divided and this application Aug. 5, 1969, Ser. No. 861,535
Int. Cl. G01v 1/16
U.S. Cl. 340—17                                       2 Claims

ABSTRACT OF THE DISCLOSURE

Seismic waves are detected and recorded by generating acceleration signals through prestressed piezoelectric crystals of wide band frequency capability and passing the wide band signal to a multi-stage amplifier having wide band input and progressively narrowed frequency band through successive stages of the amplifier while retaining signals of frequency in the range of about 100 cycles per second and above.

---

Figure 1:
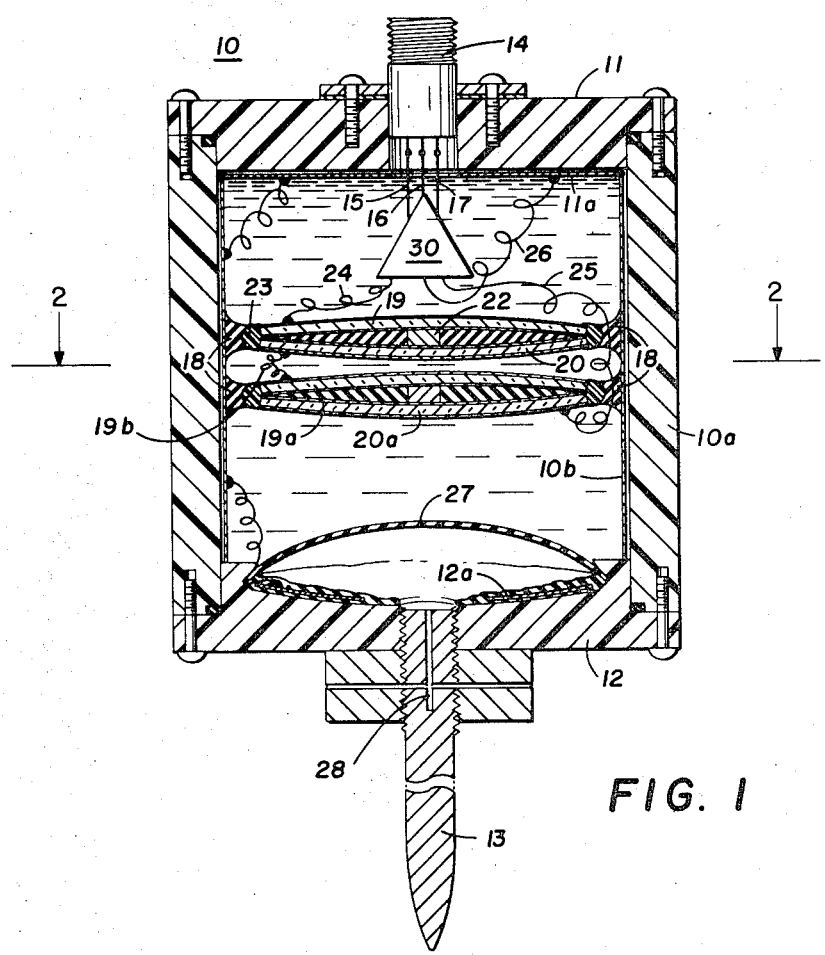

This application is a division of application Ser. No. 799,139, filed Dec. 31, 1968, now Pat. No. 3,489,997.

This invention relates to seismic exploration and more particularly to a high frequency system having identical wide band inputs on each of a plurality of channels with identical progressive low frequency filtering along each channel, with wide band signal generation by a high impedance transducer.

In seismic exploration it has been the practice to concentrate interest and attention to the low frequency portion of the seismic spectrum. In general, the frequencies of interest have been below 100 cycles per second with various provisions being made for filtering to select narrow band information for recording and display. Accordingly, time scales on seismic records in seismic record sections have been of the order of 15 inches per second or less with timing markers or timing lines on such records being spaced at 0.01 second apart with resolution generally of the order of about 0.001 second. This approach has carried over into automated data processing operations. More particularly, in digital seismic systems the seismic signals are digitized at 0.001, 0.002, 0.003 or 0.008 second sample intervals.

It has further been considered that the earth is not responsive to higher frequencies and thus, except for operations in areas where only shallow beds having sharp boundaries are of interest, the high frequency portion of the spectrum has not been used.

Where attempts have been made to use the high frequency portion of the spectrum, ultimate recordings or displays have been found to be characterized by erratic appearance of energy which might be representative of reflections from a given boundary. In general there has been inability consistently to secure time coincidence between portions of the signals of given character as to identify a reflecting bed.

The present invention is directed to a system which has been found to have overcome the problems present in prior operations. It is believed that the results achieved by the present invention in a combination of a plurality of elements and steps which in conjunction one with the other cooperate to permit the reliable recording of energy reflected from a given subsurface horizon in such a manner as to permit analysis of the resultant record confidently to postulate the character of the reflecting horizon from signals of the frequencies predominately above 100 cycles per second.

More particularly, in accordance with the present invention there is provided a plurality of seismic signal channels each having a first stage including a high impedance accelerometer with provision for maintaining wide band capability to apply to each channel a signal which contains all acceleration energy sensed by the detector from near zero frequency to a frequency of the order of 1000 cycles per second or more. Each channel is provided with a plurality of identical amplifying stages, each stage being characterized by the progressive raising of the lower end of the pass band to limit the output signal from each channel to frequencies generally above 100 cycles per second. Each channel has a separate programmed gain variation in each stage and provision for storing or recording the signals as to permit resolution of the high frequency components on the record or storage time scale.

In a more specific aspect, a multistage piezoelectric seismometer with a contained amplifier stage is provided for producing an output signal of wide band character. An RC filter is provided at the output of the first stage and of each succeeding stage progressively to raise the cutoff point of the lower end of the frequency spectrum.

Figure 2:
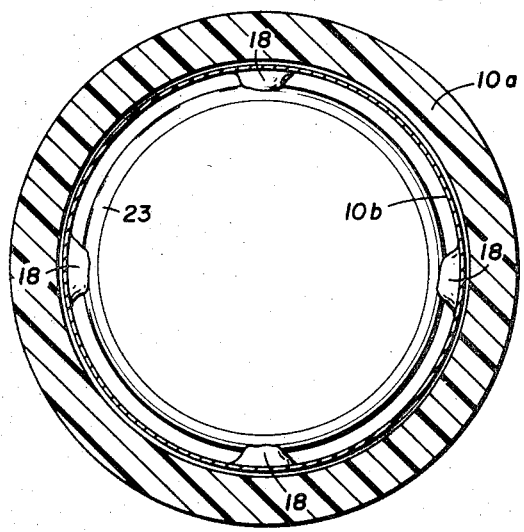
Figure 3:
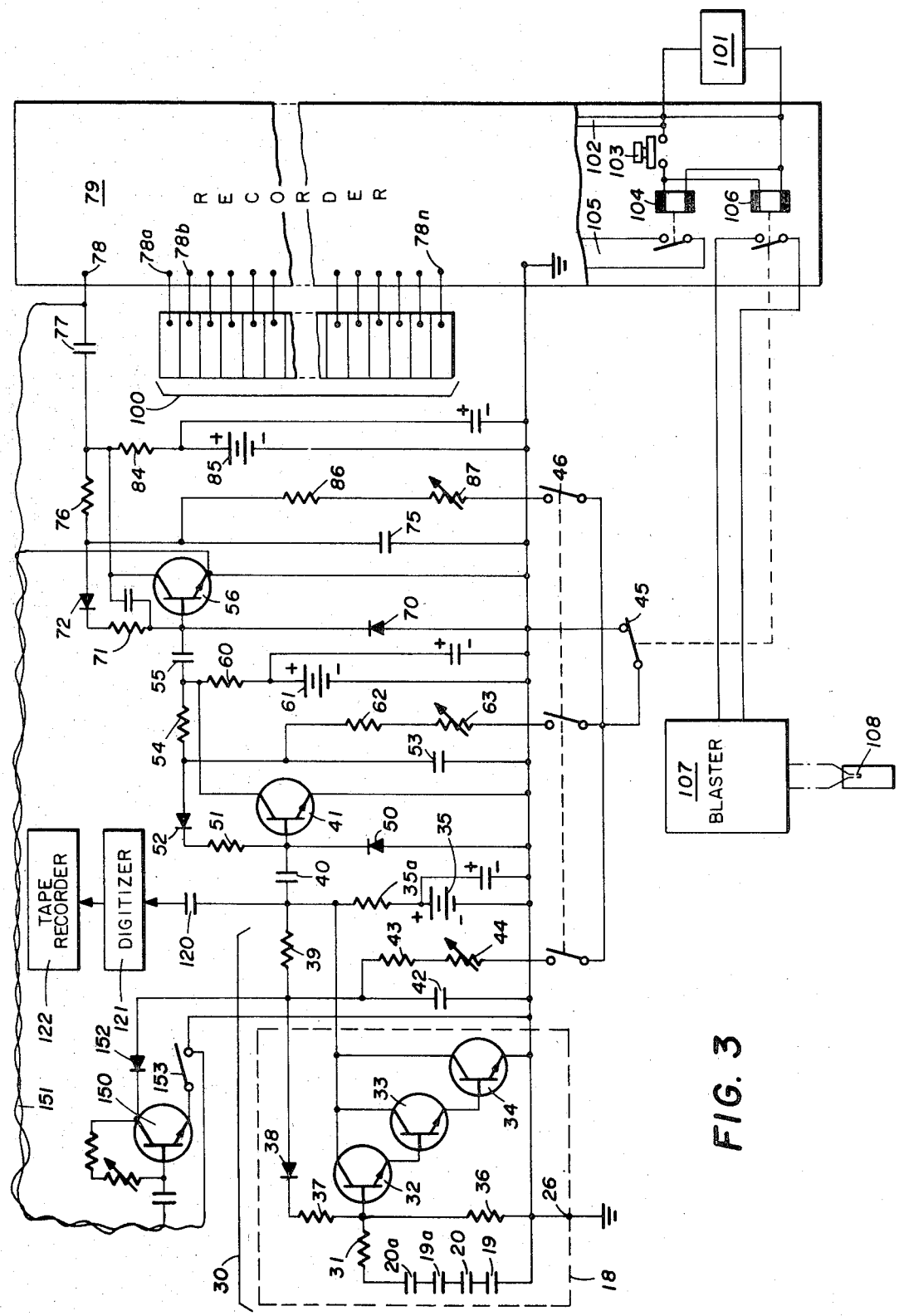

For a more complete understanding of the present invention and for further objects and advantages thereof, reference may now be had to the following description taken in conjunction with the accompanying drawings in which:

FIG. 1 is a sectional view of the seismometer employed in accordance with the present invention, FIG. 2 is a sectional view taken along line 2—2 of FIG. 1, and FIG. 3 is a circuit diagram showing one channel in detail with the remaining channels being indicated diagramatically.

Referring now to FIGS. 1 and 2, the seismometer 10 which forms the input to each channel of the present system provides a wide band acceleration dependent seismic signal, with the case 10a, top closure 11, bottom closure 12 and a spike 13 threadedly engaged by the bottom closure 12. A spike 13 is to be used to provide the engagement of the device in the ground, and any suitable type of engaging device may be used without departing from the present invention. The accelerometer will be mounted in accordance with established knowledge for the particular application for which it is to be used. The top 11 is provided with a suitable plug 14 which extends therethrough to conduct the three leads 15, 16 and 17 from the interior to the seismometer 10.

It is generally preferred that the case of seismometer 10 be made from a material, such as a rigid cylinder of a material such as a glass-epoxy lined with copper, which will provide both thermal and electrical insulation, and an electrostatic shield for the device. The case is preferably rigid with very low thermal coefficeient of expansion to shield the same from inputs due to pressure and temperature induced changes in the case. It is desired that only acceleration produce an input. When case 10 is made of such material, it will prevent distortion of the output signal from the device. However, other suitable materials may be used.

Within the case of accelerometer 10 are disc support elements 18 bonded to the interior. Support elements 18 are spaced around the middle interior of the case and are centrally located with respect to the longitudinal axis of the case. It is preferred that only three or four of such support elements 18 be used for each supported disc for the reasons hereinafter more fully explained. Such support elements 18 may be made from a relatively hard plastic material, such as vinyl, nylon, Teflon, or other material, which will not readily recover when deformed. The elements 18 are suitably secured to the interior of the casing 10 with dowel pins (not shown) or by a suitable cement which will retain its bond when the accelerometer 10 is subject to vibrations of the nature which are to be measured. In accordance with one method of construction, small mounds of silicone rubber are applied to about four places around the edge of the discs. After the silicone rubber cures or sets up, the discs are positioned in the case. More silicone rubber is applied to the junction of cured silicone rubber and case. The silicone rubber "wedges" the discs to the case, thus permitting adjustment and retaining exact positioning of the discs. Further, the little "bumpers" of silicone rubber protect the discs from side shocks.

Four crystal discs 19 and 19a, 20 and 20a, forming two pairs of crystals, are provided. Two crystals 19 and 20 are supported with a small metal disc of shim stock 22, e.g., beryllium copper, therebetween at a central position and secured by a bonding agent. Preferably a conductor such as a silver epoxy is used at this spot only, but surrounded by a second non-conducting epoxy. The bond provides an electrical connection between adjacent faces of such crystals 19 and 20. With the disc 22 positioned at the center of either crystal 19 or 20, a nonconducting bonding agent is applied to the remainder of the surface. The two crystals are brought together with their outer peripheries held in contact while a ring of the nonconducting cement 23 is forced out from between the crystals to cover the outer periphery. Excess cement 23 is then removed before allowing it to cure.

The resultant bowing of the crystals 19 and 20 is exaggerated in FIG. 1 for the sake of clarity of the drawing. A slight bending of the crystals will result from this assembly procedure, and such slight bowing has had the effect of producing a high mechanical advantage. It prestresses the cement 23 which bonds the outer edges of the crystals into a unitary assembly. This distortion of the crystals changes during diaphragm action induced by motion of the accelerometer. The changes in bending are 180° out of phase between the crystals 19 and 20. Very low level compression and tension results from longitudinal-type wave action before the transverse surface waves from the periphery of the crystals becomes effective. The mechanical advantage of the initial longitudinal wave action can be about one hundred times greater than the subsequent surface wave action. Cement 23 used in the bonding of the edges and faces of the crystals 19 and 20 is preferably an insulating epoxy-type cement which hardens into a relatively strong bonding agent to hold the edges of the crystals secure with respect to each other. If desired, more of the disc assemblies may be used and suitably connected in series circuit as shown by conductor 19b. This may enhance the sensitivity leading to the assembly formed by discs 19a and 20a.

The epoxy cement 23 will be in tension vertically. Therefore, the epoxy and discs are under mechanical stress which acts as a bias to increase the sensitivity.

The crystals 19, 20, 19a and 20a are of the type which will provide an electric signal when they are subject to a strain. Such crystals are generally classified as piezoelectric crystals. These crystals should be nonhydroscopic. Typical examples of crystals which have been found to be satisfactory for use in the device of the present invention and their Curie points are: barium titanate, Curie point 120° C.; lead titanate-lead zirconate, Curie point 300° to 365° C.; and sodium potassium niobate, Curie point 300° C.

A typical example of size of crystal discs of the lead zirconate-lead titanate which may be used in the present invention includes lead zirconate-lead titanate crystal discs having an outer diameter one and three-fourths inches and a thickness of one-hundredth of an inch. Both faces of each crystal disc are silvered and the discs are assembled as illustrated in FIG. 1 whereby the negative side of the discs are adjacent in the assembly for series connection or a negative and positive adjacent for parallel connection. A suitable wire is also secured to each of the outer faces of the discs for series connection, or one wire is secured to the outer faces and a narrow strip of .001" thick shim stock (beryllium copper) contacts the inner faces of the discs and a wire is soldered to this strip of shim stock for parallel connection, to provide the leads 24 and 25 necessary to conduct the output of the discs to an amplifier 30, hereinafter more fully described, when they are subjected to strain. It is preferred that the leads from the crystal discs be multiple strand wires for greater flexibility and that the bare ends of the wires which are joined to the discs be soldered to the slivered faces or shim stock near the periphery of the discs.

It is noted that a copper cylinder 10b lines the inner walls of the housing 10a and a copper disc 11a provides shielding at the upper end of cylinder 10a. A copper washer 12a shields the lower end of cylinder 10a. The shield elements are electrically common, being connected to the ground terminal of amplifier 30 by way of conductor 26. Alternatively, the shield elements may be tied to the cable shield so that the connection to the amplifier ground terminal would be made externally.

A rubber diaphragm 27, preferably a silicone rubber diaphragm, is secured at the rim thereof in a suitable cement in which disc 12a is embedded. The interior of housing 10 is filled with silicone compound. The spike 13 is provided with a passage 28 to permit expansion and contraction of the filler material in response to temperature changes. The material employed preferably is of the type manufactured and sold by Dow Corning Corporation identified as Dow Corning 111 Compound. The silicone compound will protect the unit against shock, act as a hydraulic restraint and provide a weight or mass against which the crystals 19, 20, 19a and 20a work. For a special purpose, silicone oil (less damping), liquid mercury (high sensitivity), etc. could be used as the filler material.

A wide band amplifier 30 is contained within the accelerometer. It is shown in block form in FIG. 1. It is shown in detail in FIG. 3.

Referring now to FIG. 3, the detector discs 19, 19a, 20, and 20a are shown inside the electrostatic shield and are connected at one terminal to the ground point 26. The upper terminal of the series of crystals is connected by way of resistor 31 to the base of a transistor 32 which is the first stage amplifier 30 which is a series simplifier including transistors 33 and 34. The emitter of transistor 32 is connected to the base of transistor 33 whose emitter is connected to the base of transistor 34 whose emitter is connected to ground. The collectors of transistors 32–34 are connected to the positive terminal of battery 35 through collector resistor 35a. The battery 35 energizes only the amplifier 30 within the shield. This is the first stage of a three-stage amplifier channel. The base of transistor 32 is connected by way of resistor 36 to ground and by way of resistor 37, diode 38, resistor 39, and capaciter 40 to the base of transistor 41 which is in the second amplifier stage of the system.

Resistors 36 and 37 are of very high impedance, of the order of 1000 megohms, in order to assure low "current noise" and good low frequency response of the system.

The juncture between diode 38 and resistor 39 is connected by way of condenser 42 to ground and, by way of resistors 43 and 44 and manual switch 46, to a relay switch 45. The relay switch is connected to ground. The battery 35 is connected at its positive terminal through resistor 35a to the juncture between resistor 39 and condenser 40, and at its negative terminal to ground.

The base of transistor 41 is connected by way of diode 50 to ground, and by way of resistor 51 and diode 52 and resistor 54 to the collector of transistor 41. The collector of transistor 41 is connected to ground by way of resistor 54 and a filter condenser 53, and by way of condenser 55, to the base of transistor 56 which provides a third stage of amplification of the system.

The juncture between resistors 54 and condenser 55 is connected by way of resistor 60 to the positive terminal of supply battery 61, the negative terminal of which is connected to ground. The juncture between diode 52 and resistor 54 is connected by way of resistor 62 and 63 and manual switch 46 to relay switch 45.

The base of transistor 56 is connected by way of diode 70 to ground, and by way of resistor 71 and diode 72 and resistor 76 to the collector of transistor 56. The collector of transistor 56 is connected by way of resistor 76 and capacitor 75 to ground and, by way of capacitor 77 to the input of terminal 78, the first channel input of a recorder 79.

The juncture between resistor 76 and capacitor 77 is connected by way of resistor 84 to the positive terminal of the battery 85, the negative terminal of which is connected to ground. The juncture between diode 72 and resistor 76 is connected by way of resistors 86 and 87 and manual switch 46 to relay switch 45. Thus, there is shown in detail a complete amplifier channel wherein each amplifier is provided with its own separate power supply wherein each amplifier stage has an output which is characterized by a capacitive coupling such as the capacitors 40, 55 and 77. The capacitive couplings progressively raise the low frequency cutoff point of the channel. The detector system and the first stage amplification provide wide band signal capability.

Channels 78a–78n of recorder 79 are energized by signals from signal channels to the channel shown in detail in FIG. 3, the additional signal channels being collectively indicated by the reference character 100. In accordance with the invention, all of the channels leading to the recorder have identical circuits.

It will be noted that the recorder further is provided with power from a source 101. Power is applied to the recorder by way of lines 102. Power applied to the recorder is controlled by relays actuated in response to the pushbutton switch 103. The switch 103 actuates a first relay 104 which as a part of the recorder serves to start and stop the paper drive in the recorder 79 in accordance with preset limits, by way of channel 105. Preferably, a paper drive of about 80 inches per second will be employed.

A second delay relay 106 serves to control the operation of a blaster 107 to detonate a cap 108 a predetermined time interval after the paper drive on the recorder 79 has been set into motion.

Other poles of this double throw delay relay 106 represent switch 45 which opens just before the contacts close to furnish firing current to cap 108. With the switch 45 closed, the current flow through resistors 43 and 44 lowers the voltage effective on the amplifier 32–34 so that the high energy first break signals detected by the detector will not exceed the capabilities of the amplifier channel. After the switch 45 is opened, by delay relay 106, the voltage on amplifier 32–34 gradually increases to raise the gain in each stage and thereby compensate for the decrease in level of the seismic energy following the detonation of the cap 108.

In accordance with the present invention, a separate gain control function is applied to each of the stages, providing identical operation for all of the channels.

By providing wide band input it has been found possible to maintain the proper positioning along the time scale of the polarity reversals of high frequency. The high frequency signals can then be displayed showing coherence of the signal energy from a given reflector. This is believed to be due in the present invention by providing extremely wide band capabilities so that the distortion inherent at the lower end of the band is displaced so far from the frequencies ultimately used that the phase distortion, from one channel to another, is the same at high frequencies. By careful control of the progressive modification of the lower end of the band it is possible to maintain the same phase relations among channels for all high frequency components.

While the system has been shown in FIG. 3 as involving a field recording operation which ultimately produces a paper record of conventional type except for the high speed character thereof and the high frequency content of the signals, it will be noted that the system may be employed when a digitizer 121 which feeds a tape recorder 122 for the storage of the wide band signal which may later be progressively modified as to frequency content as well as signal level in accordance with the provisions of the present invention to provide high frequency seismic record. In the present case, the signal is derived from the output of amplifier 30 by way of capacitor 120 connected to the juncture between resistor 39 and capacitor 40.

In one embodiment of the inventiton, the following parameters were found to be satisfactory.

Resistor 31—15 megohms
Resistors 36, 37—1000 megohms
Transistors 32–34, 41, 56—2N3391A
Resistors 39, 54, 76—2200 ohms
Capacitor 42—0.2–200 microfarads
Resistors 35a, 60, 84—560 ohms
Batteries 35, 61, 85—12 volts
Capacitors 40, 55—0.05–0.5 microfarad
Capacitor 77—0.22–2.2 microfarads
Resistors 51, 71—180,000 ohms
Capacitors 53, 75—25 to 250 microfarads
Resistors 43, 62, 86—2200 ohms
Potentiometer 44, 63, 87—2000 ohms
Recorder 79—Honeywell Model 2106 or 1508 Viscorder (0–600 cycles per second with electromagnetically damped galvanometers).

A master control for the "maximum" gain is also superimposed on the system above described. The output signal applied to the recorder 79 actuates a transistor 150 by way of channel 151. The nonlinear output of transistor 150 is partially checked by the threshold in diode 152 so that a minimum output level may be applied to condensor 42 when the master gain control switch 153 is closed. Thus there are two gain control functions effective. One limits the maximum amplitude and is a system control, looping the entire amplifier. The other provides gain control for each stage independent of the other stages.

Having described the invention in connection with certain specific embodiments thereof, it is to be understood that further modifications may now suggest themselves to those skilled in the art and it is intended to cover such modifications as fall within the scope of the appended claims.

What is claimed is:
1. A vibration detector comprising:
  (a) a crystal assembly having two pairs of crystals,
  (b) means for bonding the edges of each pair of crystals together with means spacing adjacent sides of each said pair,
  (c) an electrically shielded housing having means for supporting said crystals at spaced apart points around the periphery thereof with one pair of crystals spaced above the other,
  (d) a fluid mass within said housing providing a weight against which said crystals work when said case is vibrated, and
  (e) a diaphragm in said housing contacting said fluid on one side and atmospheric air on the other side to permit expansion and contraction of said fluid in response to temperature changes.

2. The combination set forth in claim 1 in which a wide band amplifier is housed within said housing and has its input connected to receive the output signals from all said crystals.

References Cited

UNITED STATES PATENTS

| | | | |
|---|---|---|---|
| 2,448,365 | 8/1948 | Gillespie | 340—10X |
| 3,048,815 | 8/1962 | Thurston et al. | 340—10 |
| 3,360,772 | 12/1967 | Massa | 340—10X |
| 3,374,663 | 3/1968 | Morris | 340—17X |

RODNEY D. BENNETT, JR., Primary Examiner

B. L. RIBANDO, Assistant Examiner

U.S. Cl. X.R.

340—10

PO-1050
(5/69)

UNITED STATES PATENT OFFICE
CERTIFICATE OF CORRECTION

Patent No. 3,555,503                Dated Jan. 12, 1971

Inventor(s)  Harold B. Morris

It is certified that error appears in the above-identified patent and that said Letters Patent are hereby corrected as shown below:

Col. 4, line 18, "slivered" should be --silvered--;
   line 52, "series simplifier" should be --series amplifier--.
In heading of patent listing information on original application Ser. No. "799,138" should be --799,139--.

Signed and sealed this 8th day of June 1971.

(SEAL)
Attest:

EDWARD M. FLETCHER, JR.
Attesting Officer

WILLIAM E. SCHUYLER,
Commissioner of Pate